UNITED STATES PATENT OFFICE.

RACHEL FEIBELMAN, OF COLUMBUS, INDIANA.

IMPROVED COMPOUND FOR CURING FELONS AND SIMILAR DISEASES.

Specification forming part of Letters Patent No. 81,152, dated August 18, 1868.

*To all whom it may concern:*

Be it known that I, RACHEL FEIBELMAN, of Columbus, in the county of Bartholomew and State of Indiana, have invented a new and useful Composition for Treating Felons and other Inflammations; and I do hereby declare that the following is a full, clear, and exact description of the same.

This composition is designed for use in relieving persons suffering with felons and other inflammatory sores.

The following description will enable persons skilled in the art to compound the composition and apply the same to use in the treatment of such diseased parts.

First. Take of the best quality of camomile-flowers, four ounces, steep them in one pint of soft water, and boil until the fluid is reduced to one-half that quantity; then pour off through a cloth strainer until the decoction is perfectly pure.

Second. Take of the ashes of hard wood, such as beech, maple, or hickory, a half teacupful, add one pint of soft water and boil in like manner until reduced to a half pint; then strain in like manner.

Third. Mix the lye and decoction of camomile, and boil them about five minutes.

Fourth. Add a small quantity of alcohol, to prevent fermentation.

The preparation should be applied in the following manner: After heating the above composition, bathe the part affected by holding the sore part to be treated in the fluid for about twenty minutes. Then after drying completely, apply to the part affected the central portion of an onion, (which has been roasted in the ashes,) which should be put upon a linen cloth and bound upon the sore part.

This treatment should be repeated two or three times until relief is afforded, fresh materials being used on each occasion.

What I claim as my invention, and desire to secure by Letters Patent, is—

The composition of matter compounded from the ingredients, and substantially in the manner set forth.

In testimony whereof I have signed my name to this specification in the presence of two subscribing witnesses.

RACHEL FEIBELMAN.

Witnesses:
   JOHN A. KEITH,
   J. L. WASHBURN.